US008132174B2

(12) United States Patent
Daum et al.

(10) Patent No.: US 8,132,174 B2
(45) Date of Patent: Mar. 6, 2012

(54) CONCURRENCY MANAGEMENT IN CLUSTER COMPUTING OF BUSINESS APPLICATIONS

(75) Inventors: Andreas W. Daum, Heidelberg (DE); Markus J. Kaas, Mannheim (DE); Guenter Zachmann, Rauenberg (DE); Tobias P. Adler, Viernheim (DE)

(73) Assignee: SAP Aktiengesellschaft, Walldorf (DE)

( * ) Notice: Subject to any disclaimer, the term of this patent is extended or adjusted under 35 U.S.C. 154(b) by 746 days.

(21) Appl. No.: 12/340,222

(22) Filed: Dec. 19, 2008

(65) Prior Publication Data

US 2010/0161572 A1 Jun. 24, 2010

(51) Int. Cl.
G06F 15/00 (2006.01)
G06F 15/76 (2006.01)
(52) U.S. Cl. ....................................................... 718/102
(58) Field of Classification Search ........................ None
See application file for complete search history.

(56) References Cited

U.S. PATENT DOCUMENTS

| 6,662,252 | B1 * | 12/2003 | Marshall et al. | 710/200 |
| 6,886,081 | B2 * | 4/2005 | Harres | 711/152 |
| 2002/0122062 | A1 * | 9/2002 | Melamed et al. | 345/763 |
| 2002/0138544 | A1 * | 9/2002 | Long | 709/107 |
| 2004/0054861 | A1 * | 3/2004 | Harres | 711/163 |
| 2004/0210902 | A1 * | 10/2004 | Such | 718/104 |
| 2005/0155011 | A1 * | 7/2005 | Heik et al. | 717/100 |
| 2005/0216691 | A1 * | 9/2005 | Michael | 711/170 |

OTHER PUBLICATIONS

Michael; Scalable Lock-Free Dynamic Memory Allocation; 2004; PLDI '04.*

* cited by examiner

*Primary Examiner* — Corey S Faherty
(74) *Attorney, Agent, or Firm* — Blakely, Sokoloff, Taylor & Zafman LLP

(57) ABSTRACT

A system and method for concurrency management in an environment, in which a common pool of objects is shared by multiple users. A virtual lock owner is created for a main thread of a processing task. The main thread spawns parallel threads to update the objects in the common pool with locks. The virtual lock owner is passed to each parallel thread. Each thread (including the main thread) is associated with a thread dependent lock indicator identified by the virtual lock owner. The lifetime of the thread dependent lock indicator is coupled with the lifetime of the associated thread. The virtual lock owner is also associated with a thread independent lock indicator that has a lifetime independent of the lifetime of the main thread. Thus, the parallel threads can perform object update with lock protection even if the main thread aborts.

20 Claims, 5 Drawing Sheets

CONCURRENCY MANAGEMENT IN CLUSTER COMPUTING OF BUSINESS APPLICATIONS

FIELD OF THE INVENTION

The present invention relates generally to concurrency management in a cluster computing environment. More particularly, this invention relates to the management of a shared data repository that is accessed by multiple users and multiple computers.

BACKGROUND

A complex program can sometimes be executed as multiple loosely-coupled threads, with each thread processing a business function for one or more business objects. These multiple threads can be executed in parallel to reduce processing time. For example, a processing task of updating two business objects can be executed by two parallel threads that run concurrently, with each thread updating one business object. The multiple threads can be executed by more than one computer, e.g., a cluster of computers. Cluster computing can improve system performance with respect to processing duration and system availability.

When a processing task is executed as multiple threads on a cluster of computers, each thread may need to update an object in a shared repository that is accessible by multiple users. To ensure data integrity, a user has to obtain an access right (e.g., a lock) on an object before he can update the object. The locks on the objects can be exclusive. That is, after the user obtains the locks from the system, no other user can read from or write into these objects and all other lock requests for any of these objects will be rejected by the system. Other users may obtain locks on the objects once the user releases the locks.

Conventional concurrency management (also referred to as "lock management") uses a fixed assignment scheme that assigns an individual lock to each thread. The fixed assignment scheme tightly connects the lifetime of locks with the lifetime of the owner thread. This tight connection is not well-suited for a cluster computing environment, in which the locks are to be shared across all computers in the same cluster. This is because with the conventional scheme, a single thread crash could lead to the loss of locks of many independently running threads on multiple computers. As a result, the independent threads will be running on their own without the protection of locks. However, if the locks are not revoked after all threads of a processing task have come to an end, other follow-up processing tasks may not be able to access the locked objects. Thus, there is a need for improvement of the lock management in a multi-user environment.

BRIEF DESCRIPTION OF THE DRAWINGS

Embodiments are illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

DETAILED DESCRIPTION

A method and system for concurrency management in a multi-user, multi-computer environment is described. In one embodiment, a common pool of objects is shared by a plurality of users. A lock manager creates a virtual lock owner for a main thread of a processing task. The main thread spawns one or more parallel threads to update some of the objects in the common pool with locks. The main thread may acquire locks on the objects before spawning the parallel threads to ensure that the parallel threads can obtain the locks. The virtual lock owner is passed to the parallel threads so that the parallel threads can obtain the same locks as the main thread. Each of the main thread and the parallel threads is associated with a thread dependent lock indicator identified by the virtual lock owner. The lifetime of the thread dependent lock indicator is coupled with the lifetime of the associated thread. The locks on the objects are released when the main thread terminates normally and none of the thread dependent lock indicators with the virtual lock owner remain. The virtual lock owner is also associated with a thread independent lock indicator. The lifetime of the thread independent lock indicator is independent of the lifetime of the main thread. The thread independent lock indicator is removed when the main thread terminates normally or when none of the thread dependent lock indicators with the virtual lock owner remain. Thus, parallel threads can update the objects with lock protection even if the main thread aborts.

A notable feature of the concurrency management described herein is that each thread of a multi-threaded processing task is assigned a lock entry that is identified by the same virtual lock owner. Thus, the termination of a thread does not destroy the locks used by the threads of the same processing task (also referred to as "related threads"). Further, the concurrency management uses a thread independent lock indicator that has an infinite lifetime until it is explicitly deleted by programming code or a command. The virtual lock owner and the thread independent lock indicator allow a lock manager to monitor whether there are related threads actively running, or whether all of the related threads have come to an end (either a normal end or a crash). The concurrency management also maintains consistency of data objects when one or more threads of a processing task crash. Although some lock entries remain after a crash, a crash does not create obsolete lock entries. Obsolete lock entries can be detected and removed by a garbage collector that runs in the background or upon request.

Figure 1:
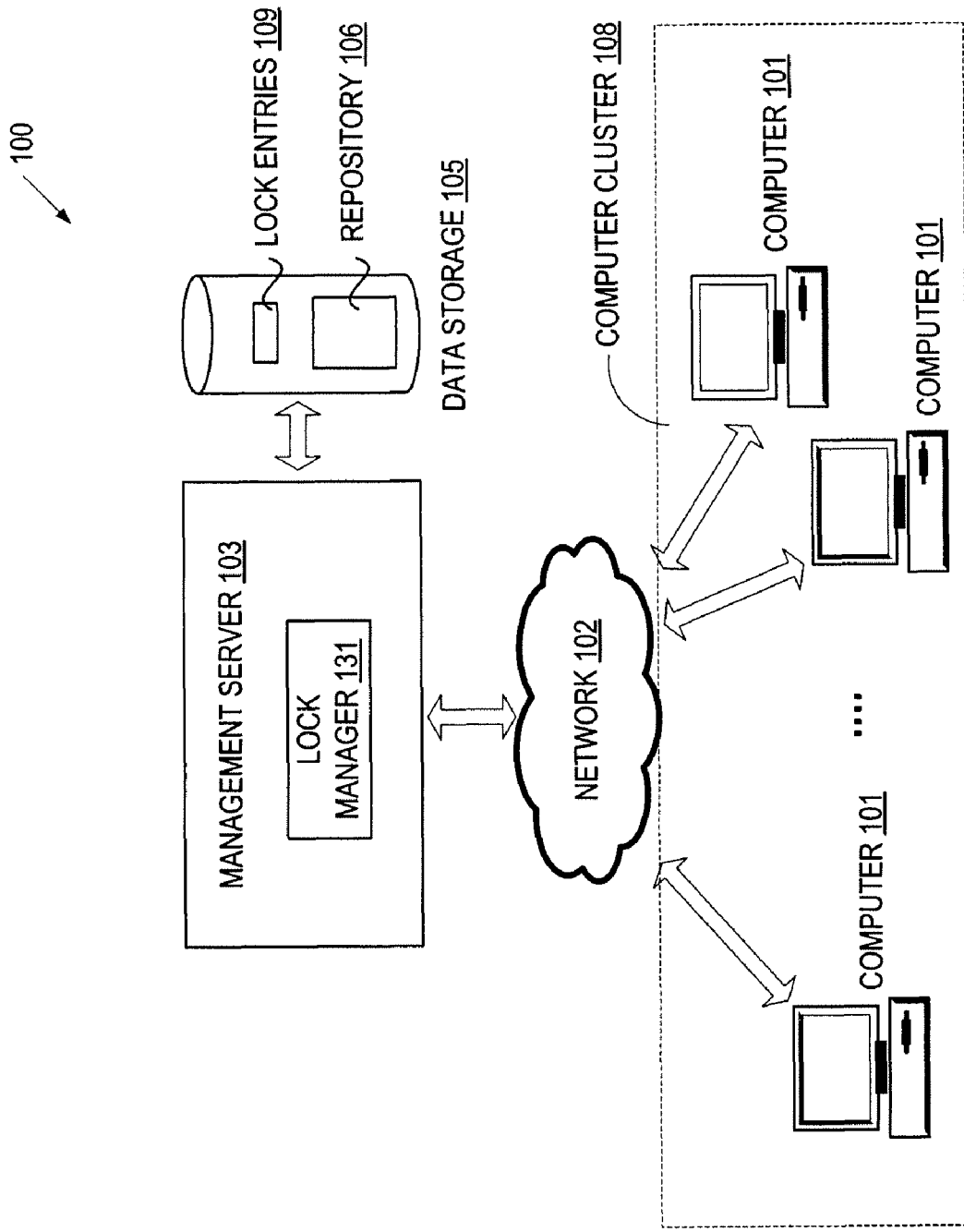
FIG. 1 illustrates a network architecture in which embodiments of the present invention may be implemented.

FIG. 1 shows an embodiment of a network environment in which a system 100 may operate. System 100 includes a plurality of computers 101 and a management server 103 coupled by a network 102, which may be a public network (e.g., the Internet) or a private network (e.g., an Ethernet or a Local Area Network (LAN)). Computers 101 may be, for example, personal computers (PCs), servers, workstations, mobile phones, palm-sized computing devices, personal digital assistants (PDAs), or the like. In one embodiment, computers 101 form a computer cluster 108 that includes a plurality of interconnected computers coordinated to perform processing tasks. Computer cluster 108 may include one or more additional networks (e.g., LANs or proprietary networks) to interconnect computers 101.

In one embodiment, management server 103 is locally coupled to data storage 105 in which a repository 106 is stored. Repository 106 contains a common pool of objects that can be accessed by computers 101 using shared database protocols. Data storage 105 may include one or more storage devices (e.g., read only memory ("ROM"), random access memory ("RAM"), magnetic disk storage media, optical storage media, flash memory devices, etc.), that are local and/or remote from management server 103. In one embodiment, repository 106 stores multiple business objects (also referred to as "objects") that can be used by business processes, e.g., inventory management, product management, etc. Management server 103 can retrieve the objects and present the objects to a user via a user interface on a display connected to management server 103 or any computer 101.

According to one embodiment of the present invention, repository 106 can be accessed by multiple users and multiple computers. Each user can start one or more processes that run on computers 101. The processes may need to read from and write into repository 106 during runtime. To ensure the integrity of the data in repository 106, management server 103 includes a lock manager 131 that provides a lock for each object in repository 106. The lock may be an exclusive lock or a non-exclusive lock. When a process obtains a lock on an object, it becomes the lock owner of the object. Only the lock owner process can write to the object. The lock owner process releases the lock when it finishes writing to the object.

In the embodiment of FIG. 1, lock manager 131 maintains lock entries 109 to keep track of the processing tasks that have acquired locks on the objects in repository 106. Lock entries 109 may be stored in data storage 105 or other memory devices coupled to management server 103. Each processing task is executed as a main thread that may spawn one or more parallel threads. Each of the main thread and the parallel threads that access repository 106 has at least one individual lock entry 109. For each processing task, lock entries 109 include a thread independent lock indicator for the main thread, and a thread dependent lock indicator for each of the main thread and the parallel threads that need to update an object in repository 108. Lock entries 109 also include entries of the locks that are placed on the objects accessed by the threads. In one embodiment, lock entries 109 that belong to the same processing task are identified and owned by the same virtual lock owner that is created at the beginning of the main thread. Thus, data access to repository 108 can be more easily coordinated among the threads of the same processing task.

One notable feature of the virtual lock owner is that its lifetime is not coupled to the lifetime of the main thread. Rather, the virtual lock owner exists as long as the thread independent lock indicator exists. The thread independent lock indicator can be explicitly removed by a special command or programming code. When the main thread terminates normally (e.g., when the processing task finishes), the thread independent lock indicator is removed at the end of the main thread. In case the main thread aborts, the thread independent lock indicator and the locks on the objects remain. As the virtual lock owner "owns" the locks placed on the objects, the locks are released when the lifetime of the owner ends. If the main thread aborts, the thread independent lock indicator (as well as its virtual lock owner) can be removed when all of the related parallel threads terminate. Thus, the parallel threads that are updating the locked objects can write to the objects safely and the locks can be released in a controlled manner. In comparison, a system in which locks are owned by the main thread will encounter a problem when the main thread aborts. As the locks are owned by the main thread, the abnormal termination of the main thread will cause the locks to be released unexpectedly. As a result, the parallel threads will lose the locks on the objects and will operate without the lock protection.

According to one embodiment of the present invention, the lifetime of the thread dependent lock indicator is coupled to the lifetime of the thread to which the lock indicator is assigned. Thus, when a thread (either a main thread or a parallel thread) aborts, the thread dependent lock indicator of the aborting thread is removed. However, the thread dependent lock indicators of other threads remain to indicate that these other threads are still active. In case the main thread aborts, the thread dependent lock indicators of the parallel threads can be used to determine whether any thread of the same virtual lock owner is still using the locks. If there are no thread dependent lock indicators with the same virtual lock owner, the corresponding thread independent lock indicator and the locks can be safely removed.

Figure 2:
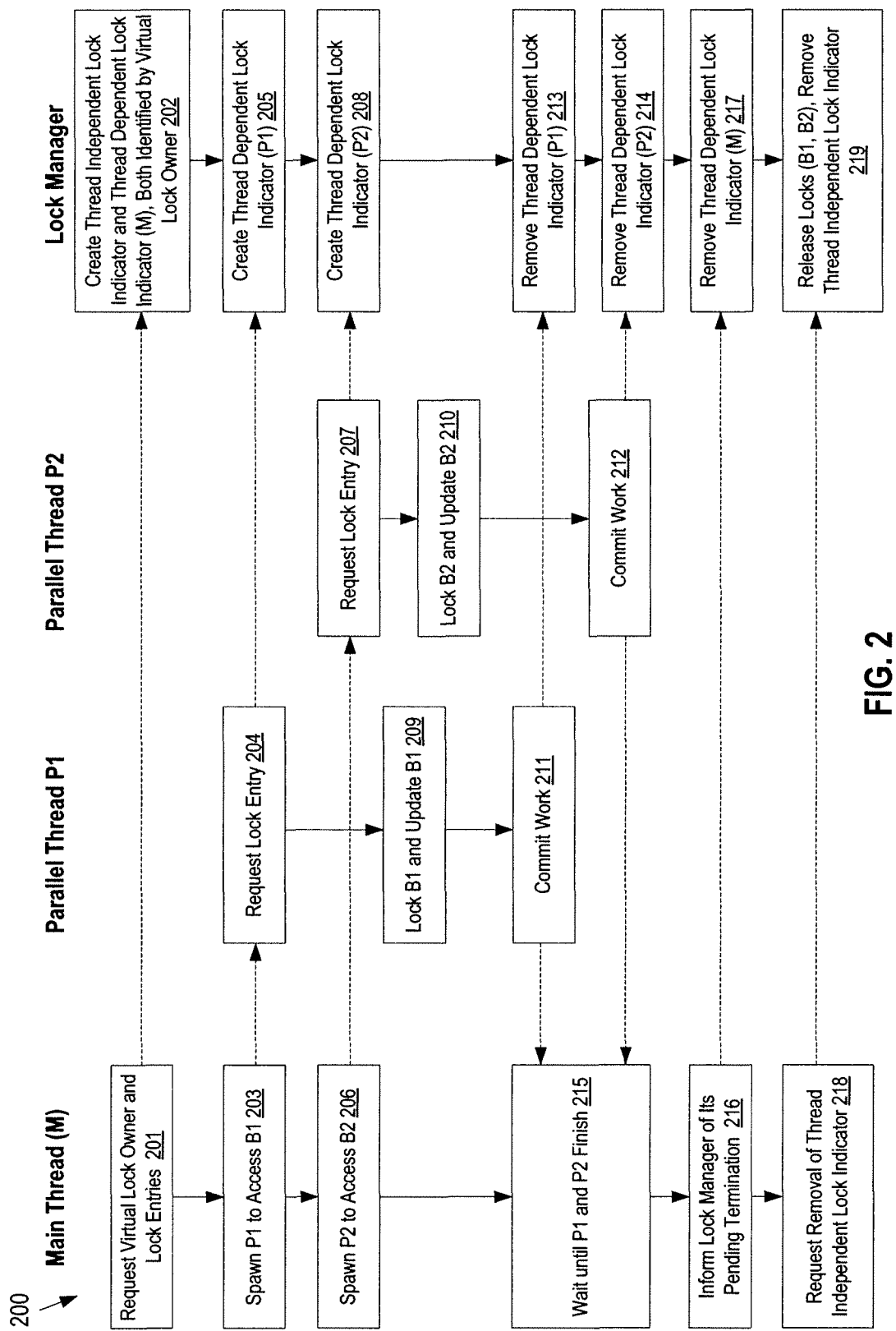
FIG. 2 is a diagram illustrating one embodiment of a multi-threaded process that updates business objects in a shared repository.

FIG. 2 is a diagram illustrating a processing task 200 executed as a plurality of threads (a main thread M and two parallel threads P1 and P2) according to one embodiment of the present invention. Main thread M may be started by a user through a user interface, and parallel threads P1 and P2 are spawned from main thread M. Processing task 200 may be performed by processing logic that may comprise hardware (e.g., circuitry, dedicated logic, programmable logic, microcode, etc.), software (such as instructions stored on a computer-readable medium executable by a processing system), or a combination thereof. In one embodiment, processing task 200 is executed by a computer (e.g., one of computers 101) or a computer cluster (e.g., computer cluster 108). The computer (or computer cluster) interacts with lock manager 131 of management server 103 to obtain access to business objects B1 and B2 in repository 106. An example of a business object is a delivery object, which has attributes indicating its delivery status. It is understood that B1 and B2 are not limited by the example described herein and can be any data objects. It is also understood that the embodiment described below is simplified to illustrate the creation and removal of lock entries. Some additional operations that are not described herein may also be included.

At the beginning of processing task 200, main thread M requests lock manager 131 to assign a virtual lock owner and create lock entries (block 201). In response, lock manger 131 assigns a virtual lock owner to own all lock entries to be created for processing task 200. Lock manager 131 also creates a thread independent lock indicator and a thread dependent lock indicator (M) (where 'M' in the parenthesis indicates its association with main thread M) (block 202). Both of the thread independent lock indicator and the thread dependent lock indicator (M) are identified by the assigned virtual lock owner. The thread independent lock indicator has an infinite lifetime until it is explicitly removed by a command or programming code. The thread dependent lock indicator (M) has a lifetime coupled with the lifetime of main thread M. A lock entry having a lifetime coupled with a thread means that when the thread terminates either normally or abnormally, the lock entry will be automatically removed.

Subsequently, main thread M spawns parallel process P1 to update object B1 in repository 106 (block 203). Before updating object B1, parallel process P1 requests lock manager 131 to create a lock entry associated with P1 (block 204). In response, lock manager 131 creates a thread dependent lock indicator (P1), which has a lifetime coupled with the lifetime of parallel process P1 (block 205). Main thread M then spawns another parallel process P2 to update object B2 in repository 105 (block 206). Before updating object B2, parallel process P2 requests lock manager 131 to create a lock entry associated with P2 (block 207). In response, lock manager 131 creates a thread dependent lock indicator (P2), which has a lifetime coupled with the lifetime of parallel process P2 (block 208). Both of the thread dependent lock indicator (P1) and the thread dependent lock indicator (P2) are identified by the assigned virtual lock owner.

After the lock entries for parallel threads P1 and P2 are created, P1 and P2 start their respective updating tasks. Parallel thread P1 first acquires a lock on B1 to exclude other processes from accessing B1 (block 209). Parallel thread P1 then updates B1. Parallel thread P2 also acquires a lock on object B2 and updates B2 (block 210). Parallel threads P1 and P2 continue the updates, in parallel, until the updates finish. Parallel threads P1 and P2 then commit work, in parallel, and terminate (blocks 211 and 212). When P1 terminates, lock manager 131 removes thread dependent lock indicator (P1) (block 213). When P2 terminates, lock manager 131 removes thread dependent lock indicator (P2) (block 214).

While parallel threads P1 and P2 are updating B1 and B2, main thread M waits until P1 and P2 finish (the term "finish" is used interchangeably with "terminate") (block 215). Main thread M may perform other necessary operations in the meantime that are not related to updating B1 and B2. When main thread M receives an indication that both P1 and P2 finish and it has completed other necessary operations, main thread M informs lock manager 131 of its pending termination (block 216). In response, lock manager 131 removes the thread dependent lock indicator (M) (block 217). Main thread M then requests the removal of thread independent lock indicator (block 218). In response, lock manager 131 releases the locks on objects B1 and B2 and removes the thread independent lock indicator (block 219). Processing task 200 then terminates.

In an alternative embodiment, main thread M may acquire the locks on B1 and B2 before spawning the parallel threads P1 and P2, e.g., at some point after block 201 but before block 203. In this alternative embodiment, as threads M, P1 and P2 use the same virtual lock owner, these threads can share the same locks and do not have locking problems. Thus, by the time that P1 and P2 are spawned at block 203, main thread M has already acquired the locks. Thus, parallel threads P1 and P2 will just reuse the same locks. One main advantage of this alternative embodiment is that at the time when main thread M spawns the parallel threads P1 and P2, P1 and P2 will get the locks. Otherwise (if M does not set the locks on B1 and B2), P1 may get the locks but P2 cannot. In order that P1 and P2 can use the same locks as M, the virtual lock owner (to which the locks are assigned) is passed to P1 and P2 so that they can use the same locks.

In one scenario where main thread M terminates abnormally (e.g., in case of a crash or core dump), lock manager 131 automatically removes the thread dependent lock indicator (M) upon the detecting the termination. The automatic removal prevents the thread dependent lock indicator (M) from becoming obsolete, as its associated thread (M) no longer exists. However, the thread independent lock indicator remains to provide information about the virtual lock owner, and may additionally provide information about the threads and locks relating to the same processing task. Thus, parallel threads P1 and P2 will be able to update objects with lock protection. As a result, data integrity of repository 106 can be protected.

Figure 3:
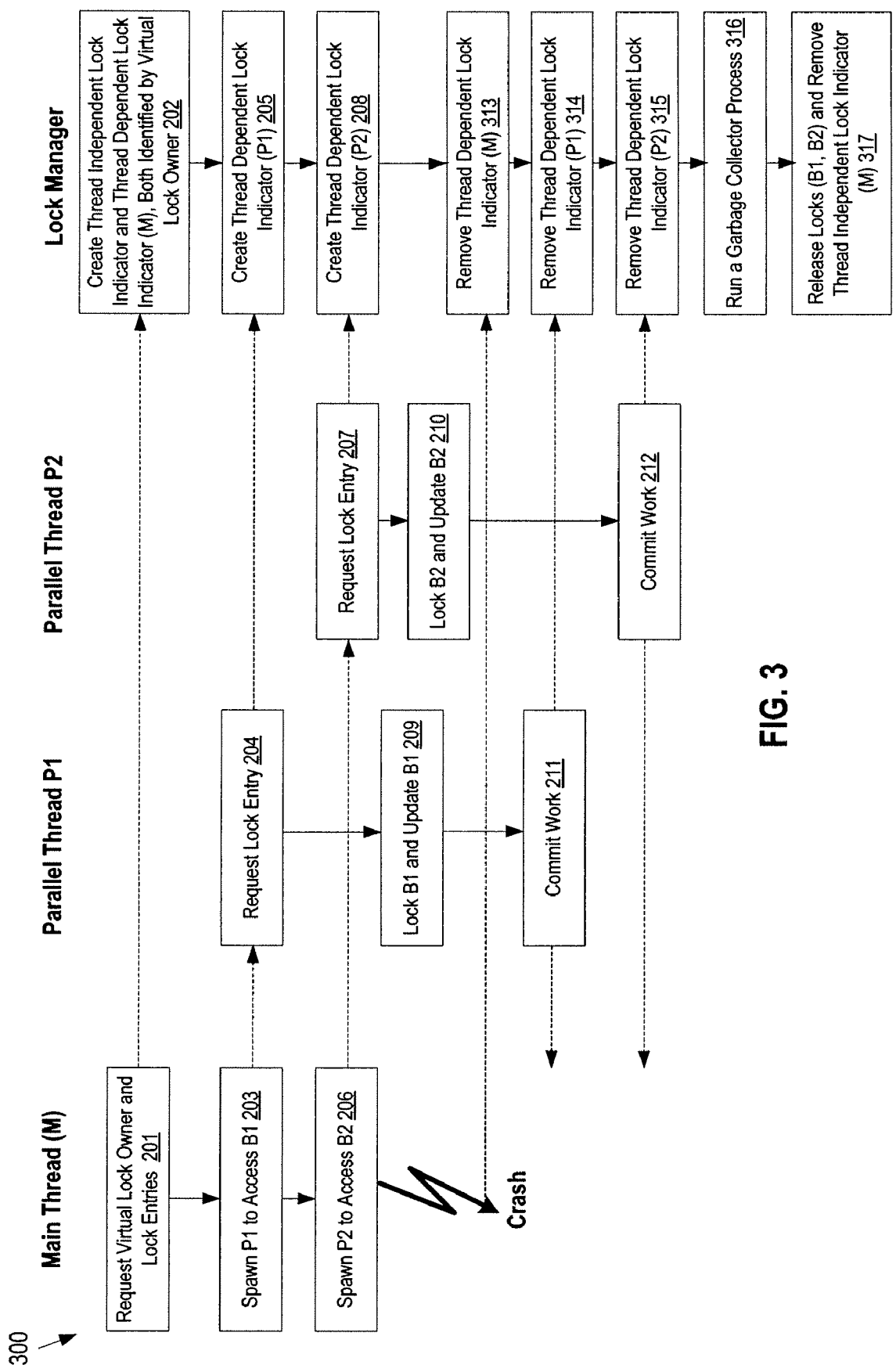
FIG. 3 is a diagram illustrating a scenario in which the main thread of the multi-threaded process of FIG. 2 crashes.

FIG. 3 is a diagram illustrating a processing task 300 executed as a plurality of threads (main thread M and two parallel threads P1 and P2) according to one embodiment of the present invention. Processing task 300 is executed by the same computing entities as processing task 200. However, main thread M of processing task 300 crashes before it can terminate normally. The operations of processing task 300 are the same as those of processing task 200 from block 201 to block 212. Thus, the following description starts at block 313 when lock manager 131 receives an indication that main thread M has crashed.

In response to the indication that main thread M has crashed, lock manager 131 removes the thread dependent lock indicator (M) (block 313). The locks placed on objects B1 and B2 and the operations of parallel threads P1 and P2 are not affected by the crash. Lock manager 131 removes the thread dependent lock indicators (P1, P2) when the corresponding parallel threads terminate (blocks 314 and 315).

In one embodiment, the remaining thread independent lock indicator can be removed by a garbage collector process that runs in the background or upon request. Lock manager 131 runs the garbage collector process to detect and remove obsolete lock entries. The garbage collector process determines whether a thread independent lock indicator has none of its related thread dependent lock indicators in existence. A thread dependent lock indicator is related to a thread independent lock indicator if they both have the same virtual lock owner. The garbage collector process can periodically or upon request go through each existing thread independent lock indicator, obtain the virtual lock owner from the thread independent lock indicator, and determine whether the virtual lock owner has any active threads (as indicated by the existence of those thread dependent lock indicators having the virtual lock owner). If there is one active thread has the virtual lock owner, the thread independent lock indicator is not obsolete. However, if none of the active threads have the virtual lock owner, the garbage collector process will determine that the thread independent lock indicator has become obsolete and remove it. The garbage collector can be implemented as transaction logic which is automatically executed as a separate thread. In an alternative embodiment, the garbage collector process detects obsolete lock entries upon request, e.g. when a transaction is started or when an event is triggered. The removal of the detected obsolete lock entries can be performed automatically as part of the garbage collection process, or by a user (e.g., a system administrator) removes the detected obsolete lock entries.

In a scenario where one of the parallel threads terminates abnormally (e.g., in case P2 crashes), lock manager 131 automatically removes the thread dependent lock indicator (P2) upon detecting the termination. The automatic removal prevents the thread dependent lock indicator (P2) from becoming obsolete, as its associated thread (P2) no longer exists. The lock on objects B1 and B2 remain, as their lifetime is associated with the lifetime of the thread independent lock indicator that is unaffected by the crash. Thus, the crash of P2 does not affect the lock protection of main thread M and parallel thread P1.

Figure 4:
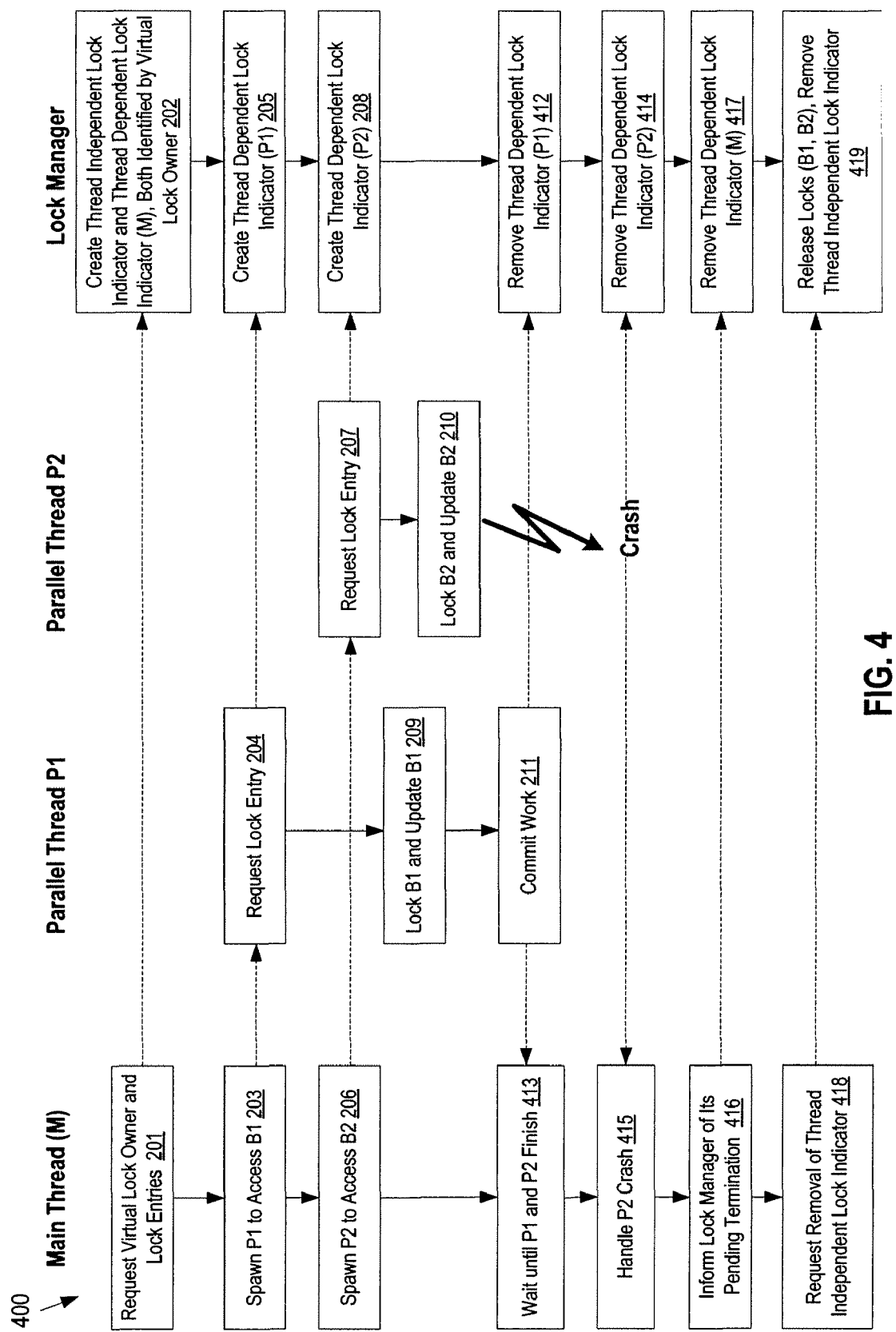
FIG. 4 is a diagram illustrating a scenario in which a parallel thread of the multi-threaded process of FIG. 2 crashes.

FIG. 4 is a diagram illustrating a processing task 400 executed as a plurality of threads (main thread M and two parallel threads P1 and P2) according to one embodiment of the present invention. Processing task 400 is executed by the same computing entities as processing task 200. However, parallel thread P2 of processing task 400 crashes before it can terminate normally. The operations of processing task 400 are the same as those of processing task 200 from block 201 to block 211 (where P1 commits work). Thus, the following description starts at block 412 when lock manager 131 receives an indication that parallel thread P2 has crashed.

After P1 commits work, lock manager 131 removes the thread dependent lock indicator (P1) (block 412). In the meantime, main thread M is waiting for P1 and P2 to finish their work (block 413). At this point, parallel thread P2 crashes. In response to the indication that parallel thread P2 has crashed, lock manager 131 removes the thread dependent lock indicator (P2) (block 414), and main thread M enters a crash-handling procedure (block 415). The locks placed on objects B1 and B2 and the operations of parallel thread P1 are not affected by the crash. After main thread M finishes other necessary operations that it needs to perform, main thread M informs lock manager 131 of its pending termination (block 416). In response, lock manager 131 removes the thread dependent lock indicator (M) (block 417). Main thread M then requests the removal of the thread independent lock indicator (block 418). In response, lock manager 131 releases the locks on objects B1 and B2 and removes the thread independent lock indicator (block 419). Processing task 400 then terminates.

Figure 5:
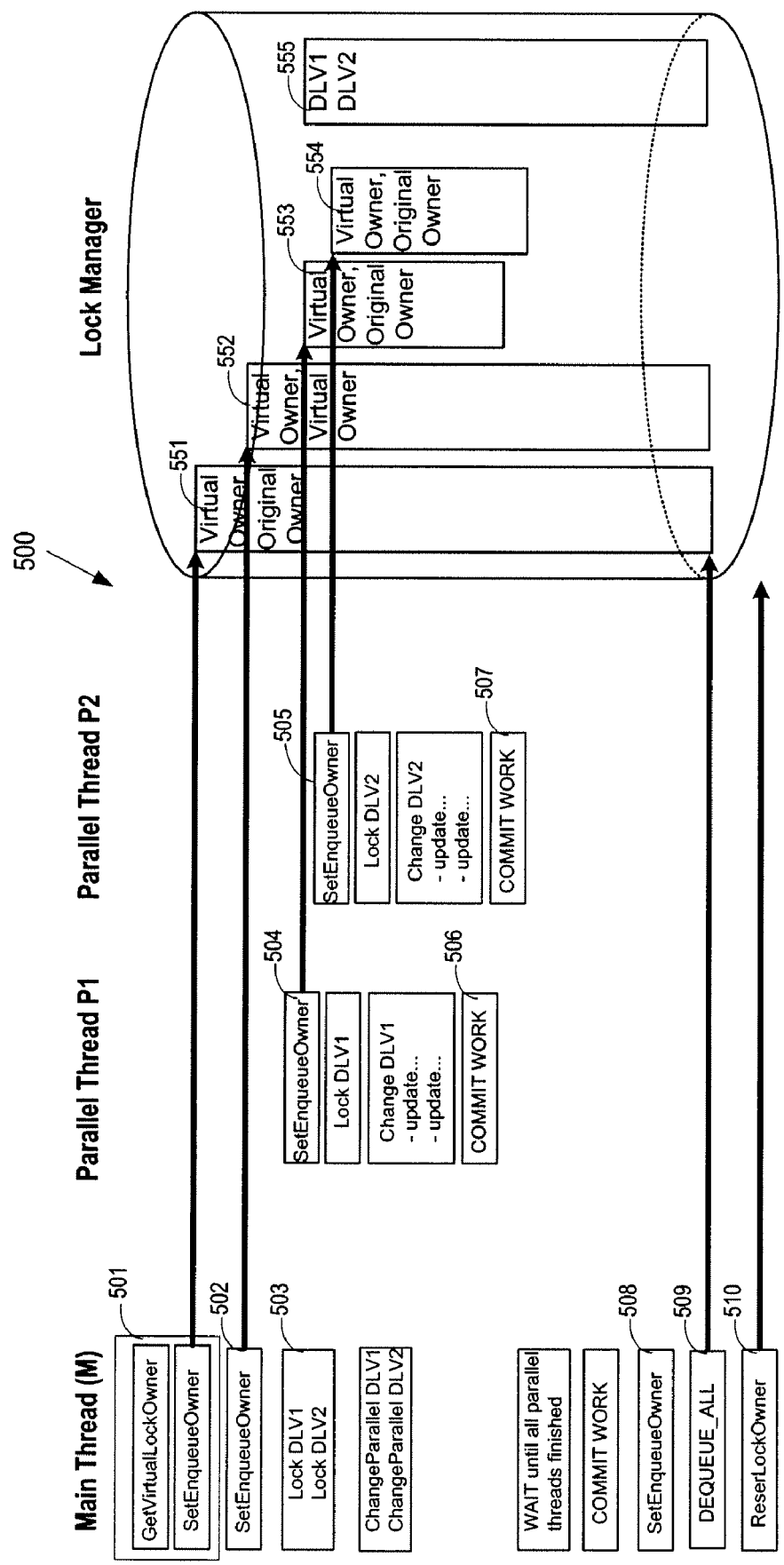
FIG. 5 is a diagram illustrating additional details of the embodiment shown in FIG. 2.

FIG. 5 is a diagram illustrating an example of additional details of the thread operations of FIG. 2 when all of the threads terminate normally. This example provides further details on lock entries and the operations of creating and removing these lock entries. Initially, main thread M sends lock manager 131 the messages "GetVirtualLockOwner" and "SetEnqueueOwner" (block 501). The message "GetVirtualLockOwner" informs lock manager 131 of the start of a new process (e.g., a multi-threaded processing task 500) that is associated with a virtual lock owner, and "SetEnqueueOwner" requests lock manager 131 to create a new thread-independent lock entry associated with the virtual lock owner. In response, lock manager 131 creates a thread independent lock indicator 551, which has a virtual lock owner (indicated as "VirtualOwner") and an original owner (indicated as "OriginalOwner"). The VirtualOwner identifies all lock entries belonging to the same processing task by the virtual lock owner, and the OriginalOwner identifies the thread for which the lock entry is created.

Subsequently, main thread M sends lock manager 131 another "SetEnqueueOwner" message to request the creation of a new thread-dependent lock entry associated with the virtual lock owner (block 502). In response, lock manager 131 creates a thread dependent lock indicator 552 for main thread M. Main thread M then proceeds to request locks on two business objects DLV1 and DLV2, which may be delivery objects used in a product management process (block 503). In response, lock manager 131 creates lock entries 555 for objects DLV1 and DLV2, both of which are identified by the same virtual lock owner as thread independent lock indicator 551. Main thread M then spawns parallel thread P1 to update object DLV1 and parallel thread P2 to update DLV2. Parallel threads P1 and P2 each send a "SetEnqueueOwner" message to lock manager 131, in parallel, to request creation of lock entries associated with the virtual lock owner (blocks 504 and 505). In response, lock manager 131 creates a thread dependent lock indicator 553 for P1 and a thread dependent lock indicator 554 for P2, both of which are identified by the same virtual lock owner as thread independent lock indicator 551. Lock manager 131 removes thread dependent lock indicators 553 and 554 when the corresponding parallel threads commit work (blocks 506 and 507).

In one embodiment, after both parallel threads P1 and P2 commit work, main thread M sends a "SetEnqueueOwner" message to lock manager 131 to confirm that main thread M is still owned by the same virtual lock owner (block 508). Main thread M subsequently sends a "Dequeue_All" message to lock manager 131 to request removal of all lock entries associated with the virtual lock owner, including thread independent lock indicator 551 (block 509). At this point, main thread M may also send a "ResetLockOwner" message to lock manager 131 to request its lock owner be reset to the original owner (block 510). The "ResetLockOwner" message defines a starting state for subsequent transactions (if any) for main thread M, which may continue performing other transactions unrelated to the lock management described herein.

Thus, a method and system for concurrency management have been described. An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that the concurrency management described herein can also be made by software and hardware that distribute the functions of embodiments of this invention differently than herein described. Such variations and implementations are understood to be made without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   creating a virtual lock owner for a main thread of a processing task to access a common pool of objects shared by a plurality of users;
   creating one or more parallel threads from the main thread to update the objects with locks on the objects;
   associating each of the main thread and the parallel threads with a thread dependent lock indicator identified by the virtual lock owner, the lifetime of the thread dependent lock indicator coupled with the lifetime of the associated thread; and
   releasing the locks on the objects when the main thread terminates normally and none of the thread dependent lock indicators with the virtual lock owner remain.

2. The method of claim 1, further comprising:
   associating the main thread with a thread independent lock indicator identified by the virtual lock owner, the lifetime of the thread independent lock indicator independent of the lifetime of the main thread; and
   removing the thread independent lock indicator when the main thread terminates normally.

3. The method of claim 1, further comprising:
   acquiring the locks on the objects by the main thread before spawning the parallel threads; and
   passing the virtual lock owner from the main thread to the parallel threads.

4. The method of claim 1, further comprising:
   associating the main thread with a thread independent lock indicator identified by the virtual lock owner, the lifetime of the thread independent lock indicator independent of the lifetime of the main thread; and in response to an indication that the main thread aborts, keeping the thread independent lock indicator of the main thread until none of the thread dependent lock indicators with the virtual lock owner remain.

5. The method of claim 1, further comprising:

in response to an indication that the main thread aborts, removing the thread dependent lock indicator of the main thread.

6. The method of claim 1, further comprising:

identifying the locks on the objects with the virtual lock owner; and removing the locks when none of the thread dependent lock indicators with the virtual lock owner remain.

7. The method of claim 1, further comprising:

obtaining information about the virtual lock owner from a thread independent ock indicator that has a lifetime independent of the lifetime of the main thread;

detecting, periodically or upon request, whether the virtual lock owner is associated with at least one active thread; and removing the thread independent lock indicator in response to a determination that the virtual lock owner is not associated with any active thread.

8. The method of claim 1, further comprising:

executing the processing task on a computer cluster or on a single computer.

9. A system comprising:

data storage to store a pool of objects shared by a plurality of users; and a management server coupled to the data storage, the management server comprising a lock manager to manage a plurality of lock entries that are used by multiple threads to update the objects, the multiple threads including a main thread and one or more parallel threads, the lock entries comprising:

a thread dependent lock indicator associated with each of the multiple threads, the thread dependent lock indicators identified by a virtual lock owner, the lifetime of each thread dependent lock indicator coupled with the lifetime of the associated thread; and locks on the objects, the locks to be released when the main thread terminates normally and none of the thread dependent lock indicators with the virtual lock owner remain.

10. The system of claim 9, wherein the lock entries further comprise:

a thread independent lock indicator associated with the main thread, the thread independent lock indicator identified by the virtual lock owner, the lifetime of the thread independent lock indicator independent of the lifetime of the main thread.

11. The system of claim 10, wherein the lifetime of the locks on the objects is associated with the lifetime of the thread independent lock indicator.

12. The system of claim 10, wherein the management server performs a garbage collector process to obtain information about the virtual lock owner from the thread independent lock indicator, to periodically or upon request detect whether the virtual lock owner is associated with at least one active thread, and to remove the thread independent lock indicator in response to a determination that the virtual lock owner is not associated with any active thread.

13. The system of claim 9, wherein the multiple threads are executed on a computer cluster or a single computer.

14. A non-transitory computer-readable storage medium including instructions that, when executed by a processing system, cause the processing system to perform a method comprising:

creating a virtual lock owner for a main thread of a processing task to access a common pool of objects shared by a plurality of users;

creating one or more parallel threads from the main thread to update the objects with locks on the objects;

associating each of the main thread and the parallel threads with a thread dependent lock indicator identified by the virtual lock owner, the lifetime of the thread dependent lock indicator coupled with the lifetime of the associated thread; and releasing the locks on the objects when the main thread terminates normally and none of the thread dependent lock indicators with the virtual lock owner remain.

15. The non-transitory computer-readable storage medium of claim 14, wherein the method further comprises:

associating the main thread with a thread independent lock indicator identified by the virtual lock owner, the lifetime of the thread independent lock indicator independent of the lifetime of the main thread; and removing the thread independent lock indicator when the main thread normally terminates.

16. The non-transitory computer-readable storage medium of claim 14, wherein the method further comprises:

acquiring the locks on the objects by the main thread before spawning the parallel threads; and passing the virtual lock owner from the main thread to the parallel threads.

17. The non-transitory computer-readable storage medium of claim 4, wherein the method further comprises:

associating the main thread with a thread independent lock indicator identified by the virtual lock owner, the lifetime of the thread independent lock indicator independent of the lifetime of the main thread; and in response to an indication that the main thread aborts, keeping the thread independent lock indicator of the main thread until none of the thread dependent lock indicators with the virtual lock owner remain.

18. The non-transitory computer-readable storage medium of claim 14, wherein the method further comprises:

in response to an indication that the main thread aborts, removing the thread dependent lock indicator of the main thread.

19. The non-transitory computer-readable storage medium of claim 14, wherein the method further comprises:

identifying the locks on the objects with the virtual lock owner; and removing the locks when none of the thread dependent lock indicators with the virtual lock owner remain.

20. The non-transitory computer-readable storage medium of claim 14, wherein the method further comprises:

obtaining information about the virtual lock owner from a thread independent lock indicator that has a lifetime independent of the lifetime of the main thread;

detecting, periodically or upon request, whether the virtual lock owner is associated with at least one active thread; and removing the thread independent lock indicator in response to a determination that the virtual lock owner is not associated with any active thread.

* * * * *

UNITED STATES PATENT AND TRADEMARK OFFICE
CERTIFICATE OF CORRECTION

PATENT NO. : 8,132,174 B2  Page 1 of 1
APPLICATION NO. : 12/340222
DATED : March 6, 2012
INVENTOR(S) : Andreas W. Daum et al.

It is certified that error appears in the above-identified patent and that said Letters Patent is hereby corrected as shown below:

In the Claims, Column 9, Claim 7, line 18, delete "ock" and insert --lock--.

Signed and Sealed this
Ninth Day of October, 2012

David J. Kappos
*Director of the United States Patent and Trademark Office*